United States Patent [19]

Samokovliski et al.

[11] 4,205,771
[45] Jun. 3, 1980

[54] ELECTRODE WIRE-FEEDING DEVICE HAVING MEANS FOR AUTOMATICALLY ADJUSTING THE PUSHING FORCE FOR THE ELECTRODE WIRE

[75] Inventors: David A. Samokovliski; Petko K. Grozdanov; Alfred E. Nemechek; Simeon G. Punchev; Peter D. Petrov, all of Sofia, Bulgaria

[73] Assignee: Institule Po Zavaryavane, Sofia, Bulgaria

[21] Appl. No.: 920,793

[22] Filed: Jun. 30, 1978

Related U.S. Application Data

[63] Continuation-in-part of Ser. No. 726,278, Sep. 24, 1976, abandoned.

[30] Foreign Application Priority Data

Sep. 24, 1975 [BG] Bulgaria ............................. 33772

[51] Int. Cl.² .......................................... B65H 51/10
[52] U.S. Cl. ................................. 226/90; 226/176; 226/187
[58] Field of Search .................. 226/90, 89, 91, 176, 226/177, 180, 181, 186, 187, 188; 219/130, 131 F; 414/431

[56] References Cited

U.S. PATENT DOCUMENTS

| | | | |
|---|---|---|---|
| 3,014,519 | 12/1961 | Wright | 226/181 X |
| 3,684,152 | 8/1972 | Boden | 226/168 X |
| 3,738,555 | 6/1973 | Karnes et al. | 226/188 |

FOREIGN PATENT DOCUMENTS

1310195  3/1973  United Kingdom ..................... 226/176

*Primary Examiner*—George F. Mautz

[57] ABSTRACT

An electrode-wire feeding device in which the calibrated pushing force exerted on the electrode wire by a pair of rollers is automatically adjusted. This automatic adjustment is effected by a guide cone having an internally threaded bore which is connected to a drive motor. A housing having a hollow cylindrical externally threaded portion is adapted to be threadably engaged with the guide cone with which it is axially aligned. The housing has a pair of parallel bores the axes of which lie in a plane which is perpendicular to the feed direction of the electrode wire which is fed through the guide cone and the housing. A pair of pistons are movably mounted in the pair of bores and support a pair of rollers which are adapted to contact the electrode wire and impart a pushing and guiding force thereto. The pistons are connected to each other by a coil spring. A pair of double-armed levers are pivotally mounted on the housing. One arm of each lever is in contact with the piston and the other arm is in contact with the guide cone. The pushing and guiding force exerted by the rollers on the electrode wire is adjusted in accordance with the relative position assumed by the double-armed levers and the guide cone.

8 Claims, 7 Drawing Figures

ELECTRODE WIRE-FEEDING DEVICE HAVING MEANS FOR AUTOMATICALLY ADJUSTING THE PUSHING FORCE FOR THE ELECTRODE WIRE

This application is a continuation-in-part of application Ser. No. 726,278, filed Sept. 24, 1976, now abandoned.

This application is related to the following copending coassigned applications: (1) Ser. No. 726,280, now abandoned, based on the first-filed Bulgarian application No. 33,773 dated Sept. 24, 1975; (2) Ser. No. 726,424, now U.S. Pat. No. 4,085,880, based on the first-filed Bulgarian application No. 33,771, dated Sept. 24, 1975; (3) Ser. No. 726,279, now U.S. Pat. No. 4,098,445, based on the first-filed Bulgarian application No. 33,770, dated Sept. 24, 1975; and (4) Ser. No. 726,412, now U.S. Pat. No. 4,049,172, based on the first-filed Bulgarian application No. 31,062, dated Aug. 24, 1975.

BACKGROUND OF THE INVENTION

This invention relates to an improved device for planetary electrode wire feeding, such device having means for the automatic adjustment of a calibrated wire-advancing force. The device may be used to advantage in the field of semi-automatic and automatic electric arc welding.

There is a known planetary electrode wire feeding device with a calibrated adjustment of the wire-advancing force. Such device comprises a body, on one side of which and radially with respect to the path of feeding of the electrode wire, there are provided substantial beds with pistons disposed therein. A wire feeding roller is axially fastened to each piston, the axes of said wire feeding rollers forming an angle between them. Spaced axially from the rollers the device has an elongated cylindrical part to which there is attached a freely guiding cone, the cone being limited by a regulating nut, the cone being threadedly connected to the other end of the hollow cylindrical part of the body.

Between the guiding cone and the periphery of the body, i.e., on its hollow cylindrical part, there is disposed a calibrated spring which thrusts the guiding cone against the regulating nut. In addition, the periphery of the body has a plurality of cut-outs wherein two-armed levers are pivotally fastened. One of the ends of said two-armed levers lie upon the front part of the pistons, while the other end, by means of a roller, engages the outer surface of the guiding cone.

The electrode wire is fed forwardly with a constant force by the above-described known device. The main drawback of such prior device is the fact that it cannot be automatically adjusted, a repeated manual adjustment being required with each new electrode supply reel.

There is another known planetary wire feeding device, such device having an automatic adjustment of the wire-advancing force. Such second known device is, in fact, an improvement upon the first above-described device. In such second known device, the guiding cone has an elongated cylindrical hollow portion which is provided with an accurate thread, the cone being screwed upon a threaded cylindrical portion of the body of the device. The guiding cone is fixedly connected with the shaft of the electric motor which drives the whole device, as well as with the housing wherein the mechanism is located.

With the last above-described known device, an automatic adjustment is ensured in accordance with the diameter of the electrode wire and the advancing force applied thereto. A very substantial defect of such device, however, is that the wire-advancing force is affected by centrifugal forces during the operation of the device; a further defect of such device is that it does not work with a calibrated adjustment of the said wire-advancing force.

A disadvantage which is common to all of the above-described prior wire feeding devices is that the wire-advancing force is affected by the coefficient of friction between the wire-feeding rollers and the electrode wire itself, such coefficient substantially increasing with a decrease in the rate of feeding of the wire.

SUMMARY OF THE INVENTION

The present invention has among its objects the removal of the above-mentioned disadvantages of the prior art by providing a device wherein a higher rate of wire feeding employs the formerly harmful centrifugal forces to compensate for the decreased coefficient of friction under such conditions.

Another object of the invention is the provision of a wire feeding device having an automatic adjustment of the calibrated wire-advancing force, such device also ensuring a parallel movement of the wire-feeding rollers toward each other and into engagement with the electrode wire.

In accordance with the invention, the above objects are attained by a device which is driven by an electric motor having a hollow drive shaft, such drive shaft being rigidly connected to the guiding cone, the cone in turn being connected with a cylindrical portion of the body of the device by an accurate thread. The outer surface of the guiding cone remains in constant contact with one arm of each of the two-armed levers which are pivotally mounted upon the body of the device.

In the front portion of the body there are positioned two beds or supports for the pistons of the device. The piston beds are positioned parallel to each other and are disposed symmetrically with respect to the outlet or path of feeding of the electrode wire. Each piston bed incorporates a cut-out in one of its ends, that is, on the side of the outlet for the wire, the cut-outs of the respective piston beds being disposed at the opposite ends thereof.

Each piston has a blind central opening and an arm projecting perpendicularly therefrom, said arm carrying a stub shaft with a wire-feeding roller journalled thereon.

To the other end of the piston there is attached a cross member having a spring pin guide affixed thereto. The piston, the cross member, and the pin guide attached thereto are located in the same transverse plane, the distance between the axis of the pin guide and the blind central opening in the piston being equal to the distance between the axes of the two piston beds. The stub shafts upon which the wire-feeding rollers are journalled form angles with respect to the axis of the outlet nozzle or path of the electrode wire which range from 5°–45°.

In the blind central hole of each of the pistons there is disposed a calibrated coil compression spring, one end of which engages the bottom of the hole while the other end is telescoped about the pin guide of the other piston.

The calibrated springs constantly urge the two pistons away from each other, the wire-feeding rollers being so connected to the respective pistons that as the pistons travel away from each other the rollers approach each other, and thus grip the electrode wire between them.

Travel of the pistons away from each other is restricted by the two-armed levers, one end of each of which is in constant contact with the cross members fastened to the pistons, while the other end of each of such levers constantly engages the guiding cone disposed at the rear of the body.

In accordance with another embodiment of the invention, the piston beds are constituted by two radially movable bodies which are movably connected to the housing. Here again, as in the first described embodiment, the piston beds are disposed parallel and symmetrically with respect to the outlet nozzle or path of the electrode wire.

Each piston is connected at one of its ends to a respective one of the radially movable bodies and moves therewith. Each piston carries a wire-feeding roller, which is journalled upon a stub shaft mounted at the free end of the piston. The stub shafts are disposed perpendicular to the axes of the pistons, and form an angle of from 5°–45° with respect to the axis of the path of the wire or the axis of the outlet nozzle. Here the calibrated springs are disposed in the radially movable bodies, each such body having a blind hole drilled coaxialy thereof and receiving the respective spring. Under the effect of the calibrated springs, both radially movable bodies, together with the pistons attached thereto are constantly urged apart, while the wire-feeding rollers are constantly urged toward each other so as to engage the electrode wire between them.

The radially outward motion of the radially movable bodies, and of the pistons attached thereto, is restricted by the two-armed levers, one of the arms of each of such levers being in constant contact with said radially movable members, whereas the other arm of each of such levers constantly engages the outer surface of the guiding cone.

A major advantage of the electrode wire feeding devices in accordance with the invention is that a calibrated advancing force upon the wire is effected automatically. Another advantage is that the calibrated force does not change with higher rates of wire feeding, regardless of the decrease in the coefficient of friction between the rollers and the electrode wire under such conditions.

DESCRIPTION OF THE DRAWINGS

Illustrative embodiments of the electrode wire feeding device of the invention are shown in the appended drawings, in which.

DESCRIPTION OF THE PREFERRED EMBODIMENTS

Figure 1:
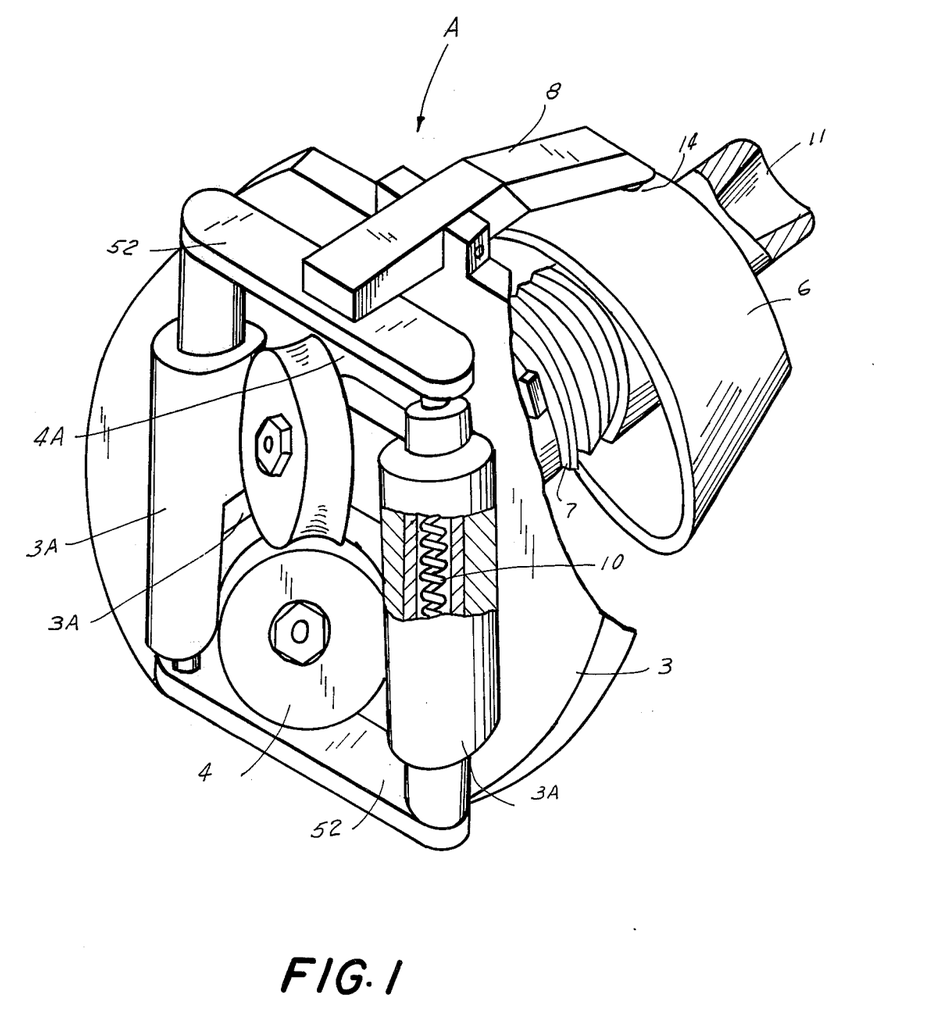
FIG. 1 is a view in perspective of a first embodiment of the electrode wire feeding device of the invention.
Figure 2:
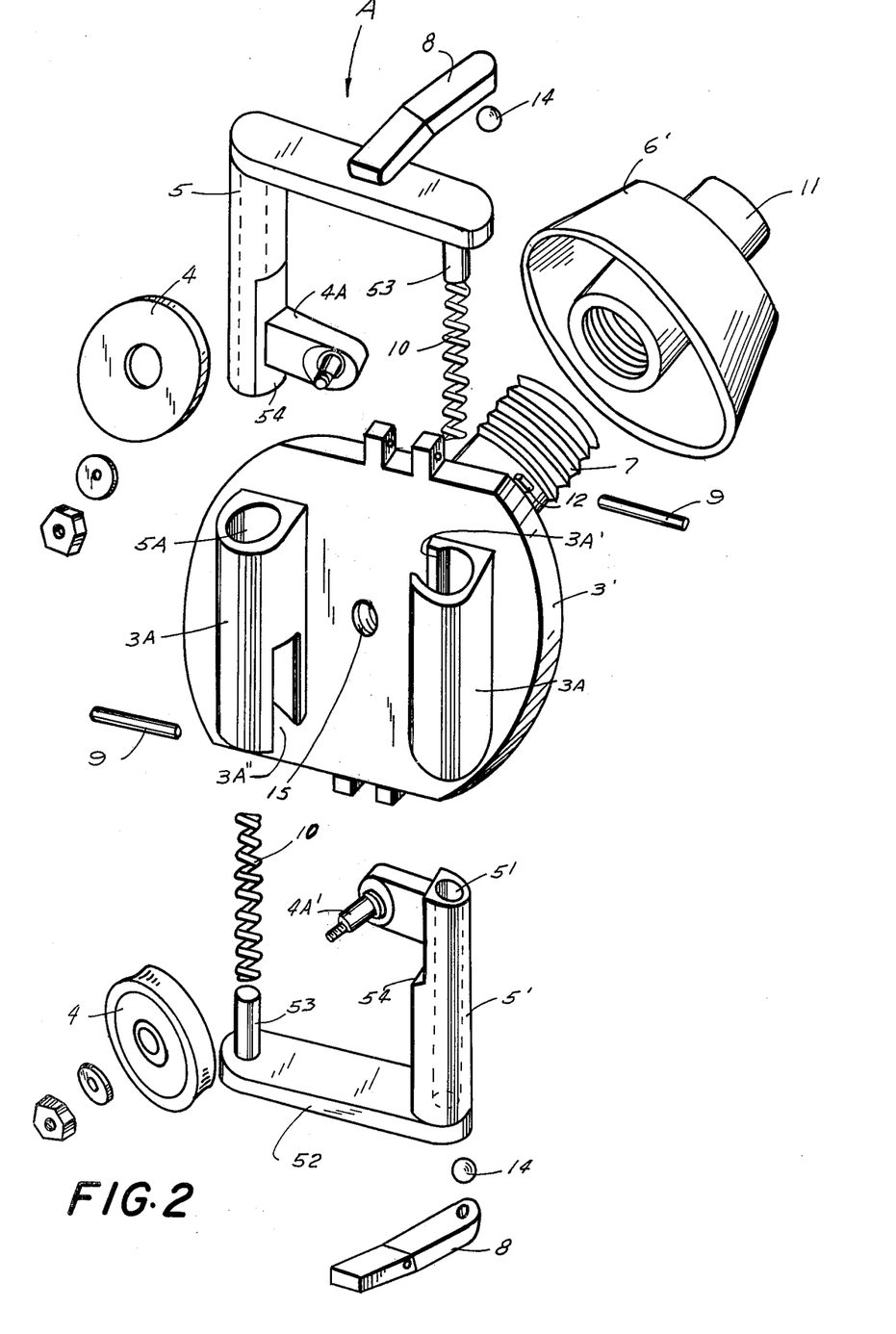
FIG. 2 is an exploded view in perspective of the device of FIG. 1.
Figure 3:
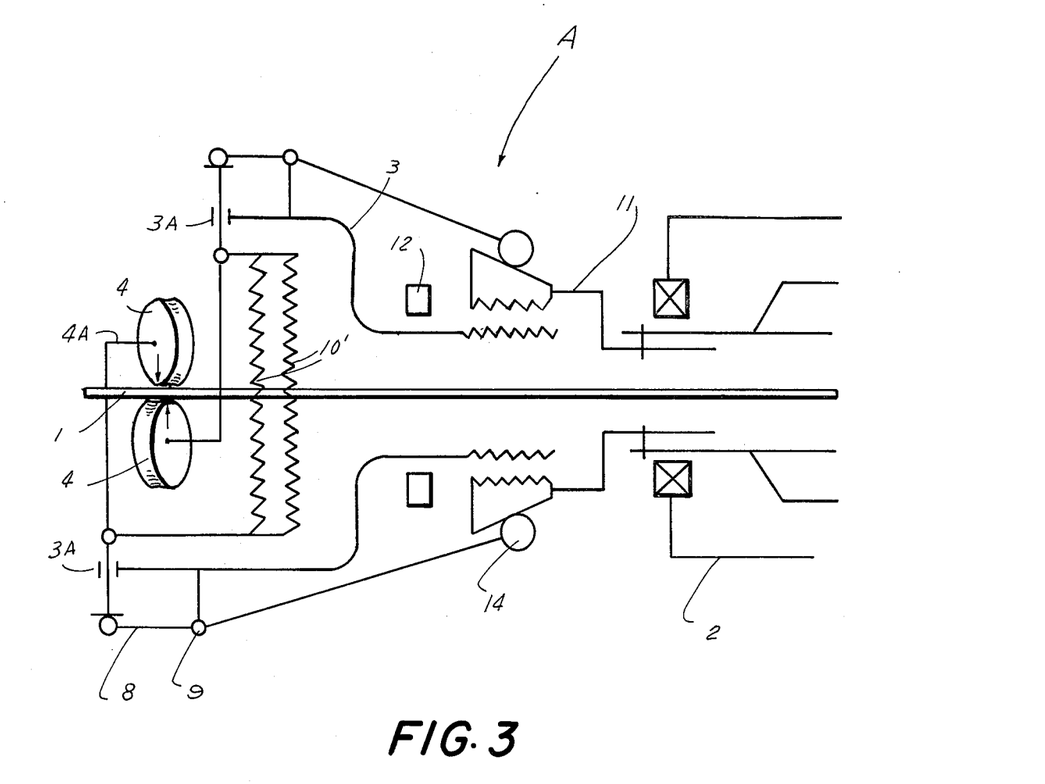
FIG. 3 is a schematic diagram illustrating the operation of the device shown in FIGS. 1 and 2.
Figure 4:
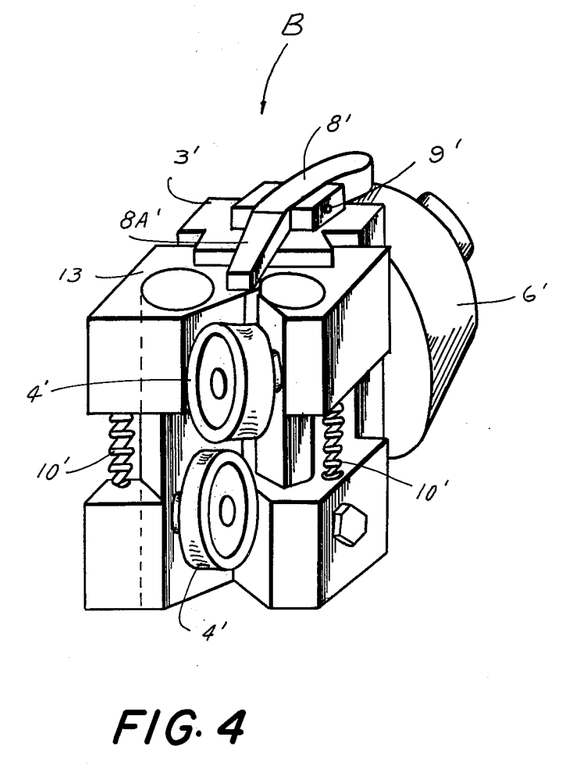
FIG. 4 is a view in perspective of a second embodiment of the electrode wire feeding device in accordance with the invention.
Figure 5:
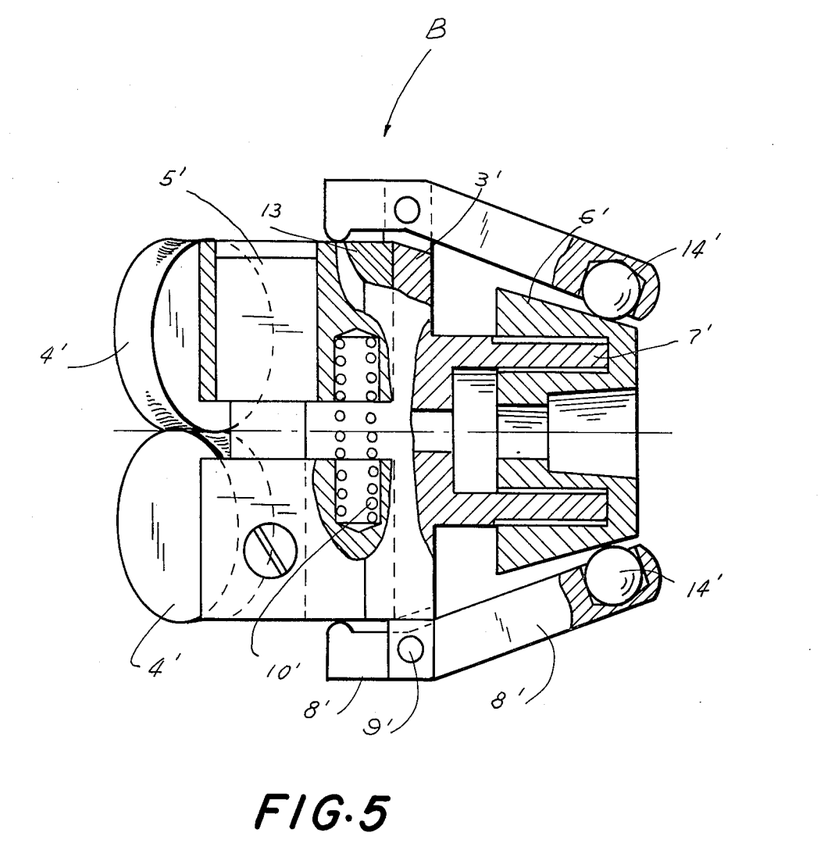
FIG. 5 is a view partially in side elevation and partially in vertical axial section of the device of FIG. 4.
Figure 6:
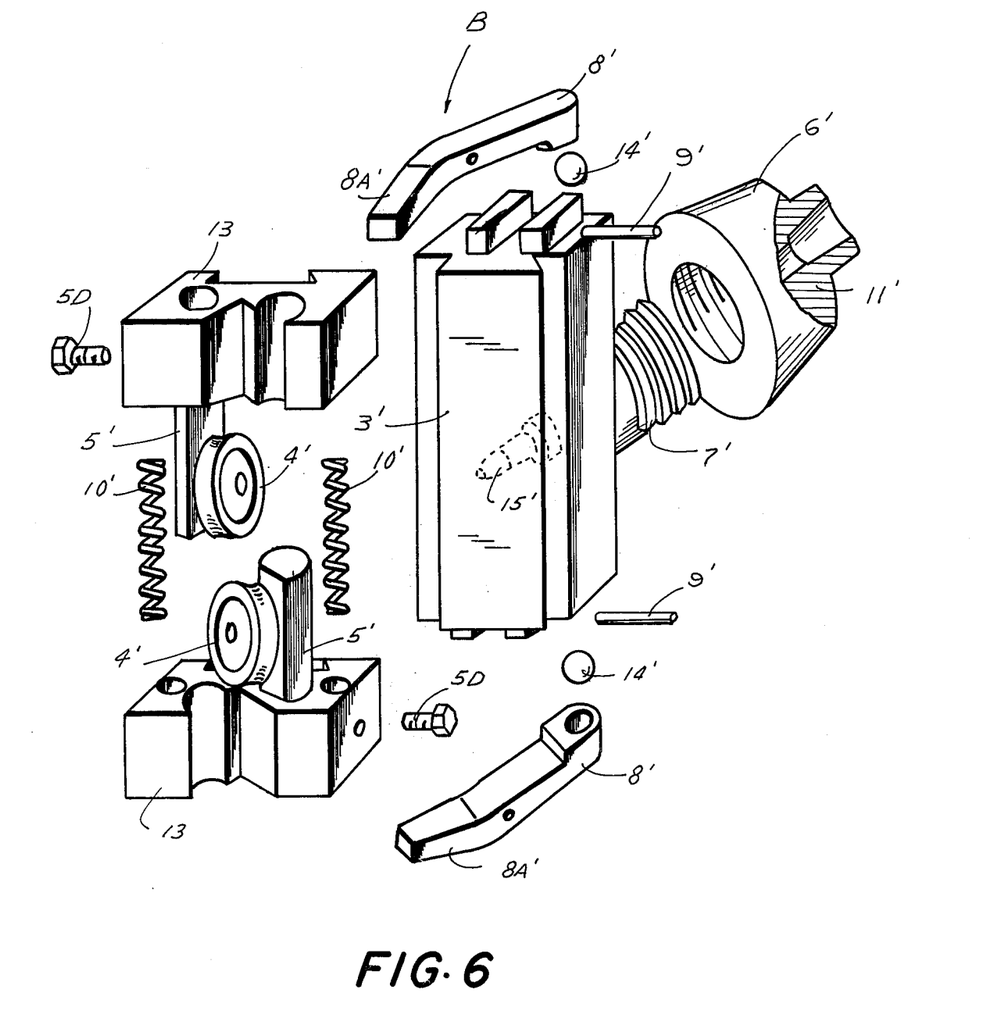
FIG. 6 is an exploded view in perspective of the device of FIGS. 4 and 5.
Figure 7:
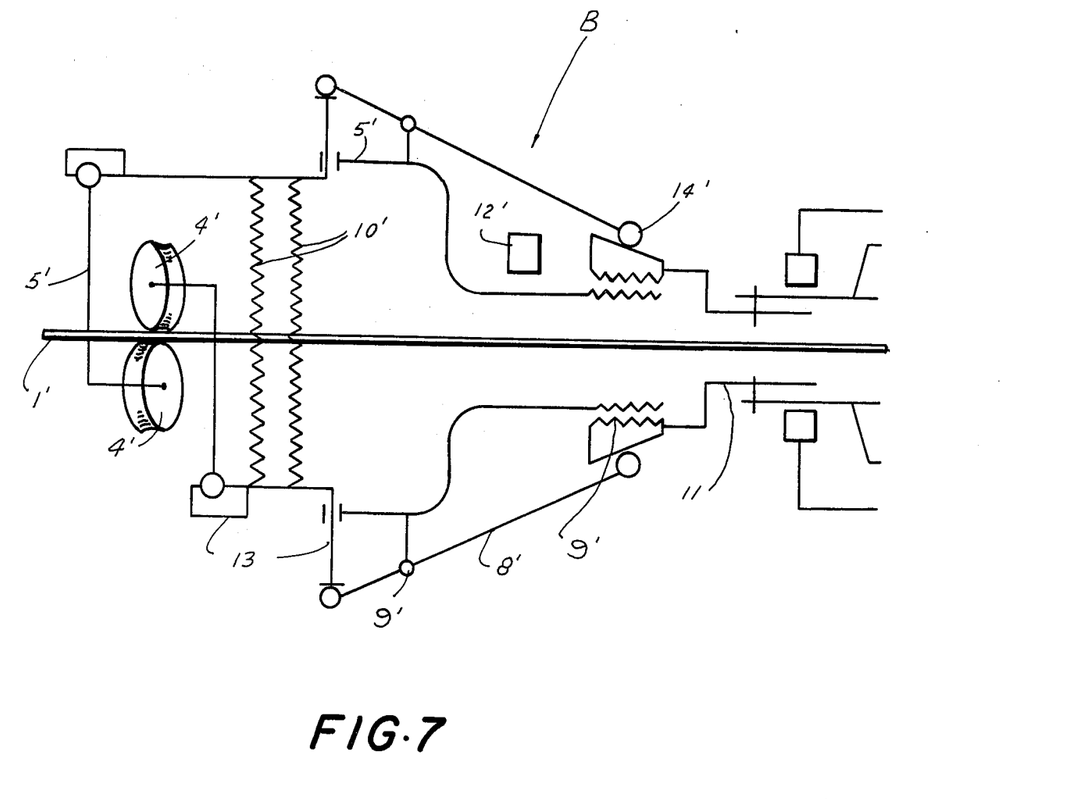
FIG. 7 is a diagrammatic view illustrating the manner of operation of the electrode wire feeding device of FIGS. 4, 5, and 6.

Turning first to FIGS. 1, 2, and 3, the embodiment of the electrode wire feeding device there shown is designated generally by the reference character A. Device A comprises a body or housing 3, the front portion of which, at the left in such figures, in a plane perpendicular to the direction of advance of the electrode wire comprises two generally cylindrical beds 3A, the beds each having a bore coaxial thereof therein in which there is slidable a respective piston 5. The beds 3A are parallel and are disposed at equal distances on opposite sides of the outlet nozzle 15 in body 3, that is, from the path of travel of the electrode wire. The beds 3A have a cut-out 3A′ therein, the cut-outs being disposed on opposite sides of the nozzle 15, that is, on the opposite ends of the respective beds 3A.

The pistons 5 are in the form of cylindrical bodies each having a central blind hole 51 therein which houses a calibrated coil compression spring 10. From the blind side of each of the pistons 5 there extends transverse to the direction of travel of the electrode wire and parallel to the body 3 a transverse member 52 to the free end of which there is secured a pin spring guide 53 which cooperates with the spring in the other bed 3A. The longitudinal axis of each piston 5, its respective cross member 52, and its guide 53 are located in the same transverse plane. The distance between the axis of the pin guide 53 and the axis of the piston 5 is equal to the distance between the axes of the beds 3A for the pistons 5.

At the other end of each piston 5 and opposite to the cross member 52 the piston is flatted at 54, an arm 4A carrying a stub shaft 4A′ extending from the piston 5 normal to the plane 54. The planes 54 of the two pistons 5 are not parallel, but extend at marked angles with respect to each other. Each plane 54 is so machined with respect to its corresponding piston 5 that their respective arms 4A and stub shafts 4A′ form an angle of from 5°–45° with respect to the axis of the outlet nozzle 15 for the electrode wire 1. Since the arms 4A are disposed in the cut-outs 3A′ of the beds 3, it is apparent that the cut-outs 3A′ are asymmetrically located with respect to each other.

The rear end portion of the housing 3, to the right in each of FIGS. 1, 2, and 3, is in the form of a hollow cylinder having an external thread 7 thereon, the guiding cone 6 being screwed onto thread 7. The guiding cone 6 is rigidly attached to a hollow shaft 11 of an electric motor 2 which drives the entire electrode wire-feeding device.

The guiding cone 6 is restricted, as regards its travel axially of the thread 7, by means of limiting stops 12 which extend radially from the threaded portion of the housing.

Pivotally attached to the periphery of the housing 3 by means of upstanding ears and pivot pins 9 there are two twoarmed levers 8, the forward arms of levers 8 being continuously in contact with the cross members 52 attached to the pistons 5, and the rear arms of such levers being continuously in contact with the outer surface of the guiding cone 6. The rear arms of levers 8 have spherical seats therein in which there are mounted balls 14 which engage the outer surface of the cone 6.

The above-described electrode wire feeding device A, shown in FIGS. 1, 2, and 3, operates as follows:

Before the electric motor 2 is started, the guiding cone 6 and the housing 3 are maximally spaced axially from each other so that the rear ends of the two-armed levers 8 engage almost the largest diametered part of guiding cone 6, the other, forward ends of the levers engaging the transverse members 52, thrusting the pistons 5 toward each other, and thus moving the wire-feeding rollers 4 away from each other and the electrode wire 1.

Upon the starting of the electric motor 2, the shaft 11 and the guiding cone 6 attached thereto rotate the housing 3 and the members secured thereto axially approaching the guiding cone 6 until the guiding cone is stopped by engagement with the limiting members 12. This action releases the pistons 5 from the pressure of the two-armed levers 8, and, under the action of the compressed calibrated springs 10, the pistons 5 are moved radially outwardly while the wire-feeding rollers 4 approach electrode wire 1, the rollers exerting a pressure upon the wire which is equal to the force of the calibrated springs 10. The entire wire-feeding device A starts to rotate around the electrode wire 1, the rollers 4 rotating simultaneously therewith and also about their stub shafts 4A', thus effecting the advance of the electrode wire.

Upon an increased speed of rotation of the electric motor 2, the centrifugal forces acting upon the movable parts of the wire-feeding device A also increase, since they are functions of the mass of the pistons 5, the cross members 52 fastened thereto, etc. This action additionally increases the pressure of the rollers 4 upon the electrode wire 1, thus compensating for the diminished coefficient of friction between the rollers and the electrode wire which accompanies an increasing speed of the electric motor 2.

In FIGS. 4–7, inclusive, there is shown a second embodiment of the electrode wire-feeding device, which is generally designated by the reference character B. Parts in embodiment B of the device which are similar to those in embodiment A are designated by the same reference character but with an added prime (').

In embodiment B, the beds of the pistons 5' are two radially movable bodies 13 which are slidably mounted upon the body 3' by means of dovetail-shaped guides which extend radially of the path of travel of the electrode wire. The beds of the pistons 5' are parallel and disposed symmetrically with respect to the axis of the outlet nozzle 15'. The pistons 5' have their free ends extending into blind bores in the opposite confronting radially movable body 13, whereby the bodies 13 and the pistons 5' are effectively stopped from further radially inward motion.

The wire-feeding rollers 4' are journalled upon stub shafts fastened to the free ends of the respective pistons. The axes of the stub shafts are perpendicular to the axial length of the pistons, and form an angle of from 5°–45° with respect to the axis of the electrode wire outlet 15'. In order to allow the pistons 5' to move together, together with the roller journalled thereon, the opposite body 13 is provided with a cut-out or slot to receive the stub shaft of the opposite wire-feeding roller. The beds of the calibrated coil compression springs 10' are formed in the radially movable bodies 13, the springs 10 being disposed within two blind holes, coaxially drilled in confronting portions of the opposite of bodies 13.

By way of contrast with embodiment A, in embodiment B the tips 8A' of the two-armed levers 8' contact the radially movable bodies 13.

Embodiment B of the electrode wire feeding device operates in essentially the same manner as embodiment A, described above. Before energizing the electric motor 2', the calibrated springs 10' are squeezed inside the radially movable bodies 13, which are thrust toward each other by means of the two-armed levers 8' while the wire-feeding rollers 4' are removed from engagement with the electrode wire 1.

Upon starting the electric motor 2', the housing 3' and the guiding cone 6' approach each other in an axial direction, and the two-armed levers 8' release the radially movable bodies 13 which, under the pressure of the calibrated springs 10', are pushed radially outwardly, while the wire-feeding rollers 4' are pressed against the electrode wire 1.

As in the case with embodiment A, a high rate of feeding of the electrode wire leads to a decrease in the coefficient of friction between the rollers 4' and the wire 1, thus decreasing the force with which the wire 1 is advanced. In order to compensate for such harmful effect, it is necessary to increase the pressure exerted by the rollers 4' upon the electrode wire 1. This effect is attained by the mass of the radially movable bodies 13, which, at higher speeds of rotation, are subjected to increased centrifugal force, so that the pressure of the wire-feeding rollers 4' on the electrode wire 1 increases. Accordingly, the value of the wire-advancing force exerted by device B remains substantially the same, regardless of variations in speed of revolution of the motor 2'.

Although the invention is illustrated and described with reference to a plurality of preferred embodiments thereof, it is to be expressly understood that the invention is in no way limited by the disclosure of such a plurality of embodiments, but is capable of numerous modifications within the scope of the appended claims.

What is claimed is:

1. A device for feeding electrode-wire by means of a pair of rollers which contact and convey the electrode wire with a force that is automatically adjusted, comprising in combination, a guide cone having a threaded bore;

a drive motor operatively connected to said guide cone and adapted to rotate it;

a housing having a hollow cylindrical externally threaded portion adapted to be threaded into said threaded bore of said guide cone, said housing also having a pair of radial bores;

a pair of pistons respectively mounted in said pair of radial bores;

each piston rotatably supporting a roller of said pair of rollers, the axes of said pair of rollers being skewed relative to each other, the electrode wire being axially conveyed through said threaded bore, said housing and between said pair of rollers, the plane passing through the axes of said pair of pistons being perpendicular to the feed direction of the electrode wire;

a pair of double-armed levers being fulcrumed to opposite sides of said housing;

a first arm of said double-armed levers being operatively connected to one piston of said pair of pistons and the other arm being adapted to contact the surface of said guide cone; and calibrated biasing means connecting said pair of pistons together.

2. The device as set forth in claim 1, wherein said biasing means is a calibrated spring which is directly connected to said pair of pistons.

3. The device as set forth in claim 1, wherein said first arm of said double-armed levers is adapted to contact and push each piston toward said electrode wire.

4. The device as set forth in claim 1, wherein said double-armed levers are pivotally supported on said housing.

5. The device as set forth in claim 1, including a pair of supporting members radially movably mounted in said housing, each supporting member being secured to one of said pair of pistons, said biasing means being formed as a coil spring which is connected to said pair of supporting members.

6. The device as set forth in claim 5, wherein said pair of radial bores in said housing are respectively disposed in said pair of supporting members.

7. The device as set forth in claim 6, wherein said first arm of the double-armed lever of said pair of double-armed levers is adapted to contact said supporting member and push it toward said electrode wire.

8. The device as set forth in claim 7, wherein each piston is rigidly connected to one supporting member of said pair of supporting members.

* * * * *